United States Patent [19]

Asao et al.

[11] 4,085,949
[45] Apr. 25, 1978

[54] RECORDING SHEETS

[75] Inventors: Yasuzi Asao; Yasuhiro Ogata, both of Fujimiya, Japan

[73] Assignee: Fuji Photo Film Co., Ltd., Minami-ashigara, Japan

[21] Appl. No.: 725,905

[22] Filed: Sep. 22, 1976

[30] Foreign Application Priority Data

Sep. 22, 1975 Japan .................................. 50-114432

[51] Int. Cl.$^2$ .......................... B32B 3/26; B41M 5/16; B41M 5/22
[52] U.S. Cl. .................................... 282/27.5; 427/150; 427/151; 428/156; 428/161; 428/165; 428/323; 428/914
[58] Field of Search ....... 282/27.5; 427/146, 150–153; 428/323, 326, 327, 411, 500, 537, 913, 914, 156, 161, 165, 164

[56] References Cited

U.S. PATENT DOCUMENTS

| | | | |
|---|---|---|---|
| 2,067,435 | 1/1937 | Chatfield et al. | 428/914 X |
| 3,411,935 | 11/1968 | Winzer | 428/914 X |
| 3,896,255 | 7/1975 | Kato et al. | 428/411 |

Primary Examiner—Thomas J. Herbert, Jr.
Assistant Examiner—Bruce H. Hess
Attorney, Agent, or Firm—Sughrue, Rothwell, Mion, Zinn and Macpeak

[57] ABSTRACT

A recording sheet for pressure measurement comprising a regularly embossed support having coated thereon at least one of a color former or color formers, preferably contained in microcapsules, and a developer.

6 Claims, No Drawings

RECORDING SHEETS

BACKGROUND OF THE INVENTION

1. Field of the Invention

The present invention relates to a recording sheet for pressure measurement, more particularly, to a recording sheet for pressure measurement comprising a regularly embossed support having coated thereon a color former or color formers and a developer, the recording sheet being capable of to measuring simply pressures such as surface pressure, line pressure, etc., with high accuracy.

2. Description of the Prior Art

There has hitherto been an urgent need for mechanically measuring various kinds of surface pressures, line pressures, etc., such as the clamping pressure of bolts in general machinery and tools, the pressed state of brake gears for automoblies, mold pressure at thermoplastic molding and thermosetting molding, clamping pressure at such moldings, adhesive pressure between a resin in a mold and a mold wall at such moldings, molding pressure in molds at such moldings, spring-contact surface pressure, clamping surface pressure in the connections of carburetors, fuel pipes, fuel tanks, etc., in fuel lines, the collision pressure exected on a human body in an automobile collision, line pressure and surface pressure of rubber or plastic rolls, the effective limits of gasket seal, to check the effective state of a gasket seal, the oil pressure in brakes, the contact pressure of gears, the contact surface pressure between solid parts, bolt clamping pressure, checking the contact state of the cock of a cock valve, the contact state of curved surfaces, the contact state of rolls for steel during working, the pressure distribution state of soles of men on a floor, the pressure distribution state between a human body and chair, and others. However, there is no method which can easily measure such pressures or methods, if any, which are useful are very complicated at use.

For example, as a method of measuring pressure such as surface pressure, line pressure, etc., there are known a strain gauge method in which the relation between stress and strain is utilized, a method in which a load meter is used, and a method in which a pressure-sensitive paint (a strain-sensitive lacquer) is used.

However, the use of the strain gauge method for measuring surface pressure, line pressure, etc., requires not only large-scale equipment such as an amplifier, a detector, a recorder, etc., but also a specific technique for operation and complicated calculations to determine the strength of the materials. Furthermore, in this case, the materials measured are required to have smooth surfaces. These matters are described in detail in J. Yarnell; "Strain Gauge", published by Corona Sha.

The method of using a pressure-sensitive paint or strain-sensitive lacquer is liable to be accompanied by uneven coating of the paint or lacquer, and has problems with respect to adhesive properties and operation.

In the case of using a load meter, it is difficult to reduce the size of the measurement system, and, thus, such a system is improper for measuring surface pressure, line pressure, etc.

One method of using a pressure-sensitive laminate for measuring pressure is described in U.S. Pat. No. 3,647,504, but the pressure-sensitive laminate disclosed in this patent is a mono-leaf recording sheet containing different kinds of microcapsules having different wall thicknesses, each containing a marking liquid of a different color. Thus, the kind of microcapsules ruptured differ according to the force applied, which results in releasing marking liquid of a specific color for each applied force or pressure. Hence, the extent of the applied force of pressure can be determined by measuring the color tone formed.

In this method, while the pressure may be measured qualitatively, it is difficult to accurately measure the pressure.

As one improvement of these faults in the afore-mentioned conventional methods or products, one method has been provided in which a pressure measuring recording sheet is brought into contact with a part to be measured and the sheet is colored by applying pressure thereto, where the pressure applied is determined from the optical density change of the colored and recorded image. In this method, the coloring of the pressure measuring recording sheet by pressure can be obtained by contacting a color former and a developer under pressure at the part to be measured, and the improved point of the method is in that surface pressure, line pressure, etc., at the part to be measured can be measured without the need of large scale equipment, highly specialized techniques or complicated calculations.

However, since the support of the recording sheet used in this improved method usually has a smooth or irregularly roughened surface, the recorded image thus colored by the application of pressure is accompanied by the formation of uneven color density, which makes it difficult to accurately measure the color of the sheet to determine the value of the applied pressure.

That is, when a support having an irregularly roughened surface is used as the support for the recording sheet, the pattern of the irregular roughness of the surface is transferred in the recorded color image to result in uneven color density, but the reason why such an uneven color density is formed even in the case of using a support having a smooth surface as the support for the recording sheet has not yet been clarified. The inventors, however, theorize the reasons to be as follows:

One of reason is considered to be based on the characteristics of the microcapsules which contribute to the coloring of the recording sheet. Namely, it is believed that pressure is directly applied to all microcapsules containing a color former, and rupture of the microcapsules is greatly influenced by the unevenness in the particle size of the microcapsules or unevenness in the wall thickness of the microcapsules. Furthermore, another reason is considered to be the influence of gases such as air, etc., existing at the portion to be measured i.e., when pressure is applied to the smooth surface of the recording sheet at the portion to be measured, the gas existing at the interface between the surface of the recording sheet and the surface of the material to be measured (where the recording sheet is set) locally collects at the interface therebetween, which results in uneven pressure being transmitted to the recording sheet for pressure measurement to form an irregular local unevenness in the optical density of the recorded color image.

SUMMARY OF THE INVENTION

This invention relates to a recording sheet for pressure measurement which is subject to a lowered occurrence of the above-mentioned difficulties.

More particularly, the invention relates to a recording sheet for pressure measurement comprising a support having a regularly embossed or regularly roughened surface having coated thereon a layer of a color former and a developer or at least one of a layer of a color former and a layer of a developer.

One object of this invention is to provide a recording sheet which enables one to simply measure surface pressure, line pressure, etc., i.e., one object of this invention is to provide a recording sheet for pressure measurement which can be used for measuring surface pressure, line pressure, etc., at the portion to be measured without the need of large scale equipment, highly skilled techniques or complicated calculations.

Another object of this invention is to provide a recording sheet for pressure measurement which can give a sharp recorded color image for accurately measuring applied pressure. In other words, the object of this invention is to provide a recording sheet for pressure measurement which can accurately measure the pressure applied to the measured portion without being accompanied by the formation of irregular optical density areas in the recorded color image formed by the application of pressure.

DESCRIPTION OF THE PREFERRED EMBODIMENTS

The recording sheet for pressure measurement of this invention may be a two-ply recording assembly comprising a set of separate supports one of which has a coated layer of a color former and the other of which has a coated layer of a developer or may be a mono-ply recording sheet comprising a support having coated thereon a layer of a color former and a developer. Furthermore, if desired or necessary, a transparent protective layer may be formed on the recording layer of the mono-ply type recording sheet to impart water resistance and oil resistance to the recording sheet.

In the case of using a two-ply recording assembly, the feature of the recording sheet of this invention lies in one or both of the surfaces of the separate supports, which carry a layer of a color former and a layer of a developer, respectively, having regularly embossed patterns. On the other hand, the feature of the mono-ply recording sheet of this invention lies in the surface of the support (having a layer of color former and developer) having a regularly embossed pattern.

In the recording sheet of this invention, the color former may be dispersed in the recording layer, but it is most desirable that the color former be microencapsulated and dispersed in the recording layer. The color former may, of course, be suspended or dispersed in a layer of polymer binder in place of being dispersed as microcapsules thereof. It is most preferred that any microcapsule containing layer in accordance with the present invention have a thickness of from about 6 to about 20 μ. The ratio of the color former:binder is not overly important, and is merely selected from ratios as are conventionally utilized in the art to obtain commonly desired degrees of coloration. In the case of employing the latter mode, the color former may be dispersed in a polymer binder by a method known in the field of color photography such as a dispersion method for water-soluble couplers or a dispersion method for oil-soluble couplers. In such cases, hardeners, e.g., formaldehyde, chromium alum, etc., may be used to strengthen the recording layer(s). Such techniques are described in C.E.K. Mees, "The Theory of the Photographic Process", 3rd. edition, published by MacMillan Co., and Kikuchi, "Shashin Kagaku (Photographic Chemistry)", New Edition, published by Kyoritsu Sha.

It is to be noted that color developers as are later described can also be used in combination with a binder, if desired; in this instance, except for replacing the color former by developer, the discussion offered in this paragraph applies to the developer/binder embodiment.

Among the afore-mentioned methods of using color formers, the technique of encapsulating the color former is most advantageously used, which technique is described below in detail.

The microcapsules of color former utilized for the recording sheets of this invention can be prepared according to, for example, a coacervation method (as described in U.S. Pat. Nos. 2,800,457; 2,800,458; 3,041,289; 3,687,865; etc.,), an interfacial polymerization method (as described in U.S. Pat. Nos. 3,492,380 and 3,577,515 and British Pat. Nos. 950,433; 1,046,469; 1,091,141; etc.,), an internal polymerization method (as described in British Patent No. 1,237,498 and French Patent Nos. 2,060,818 and 2,090,862; etc.,), and an external polymerization method (as described in British Patent No. 989,264 and Japanese Patent Publications 12,380/'62; 14,327/'62; 29,483/'70; 7313/'71; 30,282/'71; etc.,), etc.

By "color former" in this invention is meant an electron donating colorless organic compound which is colored when the compound is brought into contact with a solid acid.

The recording sheets of this invention are not substantially influenced by the kind or nature of the color former(s) used, and, hence, any kind of color former(s) can be used in this invention. For example, there are triphenylmethane compounds, diphenylmethane compounds, xanthene compounds, thiazine compounds, spiropyran compounds, etc.

Specific examples of the triphenylmethane compounds are 3,3-bis(p-dimethylaminophenyl)-6-dimethylaminophthalide (i.e., Crystal Violet Lactone), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis(2-phenylindole-3-yl)-dimethylaminophthalide, 3-p-dimethylaminophenyl-3-(1-methylpyrole-2-yl)-6-dimethylaminophthalide, and the like.

Specific examples of the diphenylmethane compounds are 4,4'-bis-dimethylaminobenzhydrylbenzyl ether, N-halophenylleucoauramine, N-2,4,5-trichlorophenylleucoauramine, etc.

Specific examples of the xanthene compounds are Rhodamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)-fluoran, 7-diethylamino-3-(methylbenzylamino)-fluoran, 7-diethylamino-3-(chloroethylmethylamino)fluoran, 7-diethylamino-3-(diethylamino)fluoran, etc.

Specific examples of the thiazine compounds are Benzoyl Leucomethylene blue, p-nitrobenzyl leucomethylene blue, etc.

Also, specific examples of the spiro compounds are 3-methyl-spiro-dinaphthopyran, 3-ethyl-spiro-dinaphthopyran, 3,3'-dichloro-spiro-dinaphthopyran, 3-benzyl-spiro-dinaphtopyran, 3-methyl-naphtho-(3-methoxy-benzo)-spiropyran, 3-propylspiro-dibenzodipyran, etc.

Moreover, as the color formers in this invention, various kinds of pigments as described in "Shinpan Ganryo Binran (Newly Edited Pigment Handbook)": edited by the Pigment Technical Society of Japan, 1st edition, published by Seibundo Shinko sha, pages 7–49, and the various kinds of pigments as described in "Shikizai Kogaku Handbook (Coloring Material Engineering Handbook)", edited by the Coloring Material Society, published by Asakura Shoten, pages 92–226, can be used.

Typical examples of these pigments used as the color formers in this invention are organic pigments such as Phthalocyanine Blue, Phthalocyanine Green, Benzidine Yellow, Hansa Yellow, Lake Red, Carmine 6B, etc., and inorganic pigments such as Ultramarine, Prussian blue, carbon black, $Fe_2O_3$, $HgS$, $PbCrO_4$, $PbO$, $TiO_2$, $ZnS$, $BaSO_4$, $CaCO_3$, etc.

Still further, dyes may be used as the color formers in this invention, e.g., dyes as are described in "Senryo Binran (Dye Handbook)", edited by the Society of Organic Synthetic Chemistry, published by Maruzen K. K. in 1970; Color Index; The Society of Dyers and Colourists of England, etc.

For example, there are xanthene dyes, triphenylmethane dyes, diphenylmethane dyes, azo dyes, bisazo dyes, polyazo dyes, anthraquinone dyes, etc.

Examples of useful xanthene dyes are Fluorescein (C. I. 45,350), Rose Bengale (C. I. 45,440), Eosine B (C. I. 45,400), Rhodamine B (C. I. 45,170), Rhodamine 6, G. C. P. Acid Red 45 (C. I. 45,386), Acid Red 51 (C. I. 45,430), Rhodamine 6G (C. I. 45,160), Rhodamine S (C. I. 45,050), Rhodamine 5G, Rhodamine 3G, Methylene Red, Eosine G, tetraiodofluoresceine, diiodofluoresceine, etc.

Examples of useful triphenylmethane dyes and diphenylmethane dyes are Crystal Violet (C. I. 42,555), Crystal Ponceau (C. I. 16,250), Malachite Green (C. I. 42,000), Victoria Blue (C. I. 44,045), Brilliant Green (C. I. 42,040), Basic Yellow 2 (C. I. 41,000), Tetrabromophenol Blue, Bromophenol Red, Methyl Voilet, Victorian Blue base, Acid Violet, Night Blue, Cyanine B, Eosine Bluish (C. I. 45,400), Eosine Yellowish (C. I. 45,380), Auramine, Eriochrome Azurol B (C. I. 43,830), Eriochrome Cyanine R (C. I. 43,820), C. I. Acid Blue-1 (C. I. 42,045), C. I. Acid Blue-147 (C. I. 42,135), C. I. Acid Green 3 (C. I. 42,085), C. I. Acid Green 5 (C. I. 42,095), C. I. Acid Green 7 (C. I. Solvent Green 15, C. I. 42,055), etc.

Examples of azo dyes useful in this invention are Acid Red (C. I. 45,100), Eriochrome Black A (C. I. 15,710), Eriochrome Black T (C. I. 15,645), Eriochrome Blue-Black B (C. I. 14,640), Eriochrome Blue-Black R (C. I. 15,705), Eriochrome Red B (C. I. 18,760), Sudan Yellow (C. I. 12,055), Sudan II (C. I. 12,140), Sudan III (C. I. 26,100), Oil Red (C. I. 26,105), Sudan Yellow RA (C. I. 11,000), Sudan Orange R (C. I. 12,055), Oil Yellow BB (C. I. 11,020), Congo Red, Tartrazine (C. I. 19,140), Basic Orange 2 (C. I. 11,270), Direct Violet (C. I. 22,570) and also the dyes as described in U.S. Pat. No. 2,596,879 and German Pat. No. 1,182,067.

Examples of acridine dyes useful in this invention are Acridine Orange (C. I. 46,005), Acridine Red (C. I. 45,000), Acridine Yellow (C. I. 46,025), Acridine Orange 2G, etc.

Examples of useful methine dyes are Basic Yellow 33, Basic Red 35, etc.

Examples of useful quinoline dyes are Acid Yellow 3 (C. I. 47,005), Dicyanine A, Quinoline Red, Quinoline Blue, Ethyl Red, Orthochrome T, Pinachrome Violet, Pinachrome Blue, etc.

Examples of useful anthraquinone dyes are Acid Blue 27 (C. I. 61,530), Acid Blue 54, etc.

Examples of other useful dyes are Alizarine, Alizarine Garnet, Quinizarine, Safranine T, Morine, Sulfophthalein, Sudan Black (C. I. 26,150), etc.

Furthermore, the acid dyes, basic dyes, and oil dyes commercially available under the following trade names can also be used as color formers in this invention.

That is, as useful acid dyes, there are Acid Alizarine Blue B (C. I. 16,680), Acid Anthracene Brown PG (C. I. 17,590), Acid Anthracene Brown R (C. I. 13,265), Acid Blue 20 (C. I. 50,405), Acid Brilliant Green J (C. I. 44,025), Acid Brown M (C. I. 20,195), Acid Cyanine B (C. I. 42,660), Acid Fast Green (C. I. 42,100), Acid Fast Yellow G (C. I. 18,965), Acid Fuchsine (C. I. 42,685), Acid Green B (C. I. 42,085), Acid Green GG (C. I. 42,095), Acid Light Yellow 2G (C. I. 18,965), Acid Red (C. I. 45,100), Acid Yellow 3 (C. I. 47,005), Acid Red 51 (C. I. 45,430), Acid Blue 27 (C. I. 61,350), Acid Blue 54, Acid Yellow 7 (C. I. 56,205), Acid Yellow 23 (C. I. 19,140), Acid Red 1 (C. I. 18,050), Acid Red 52 (C. I. 45,100), Acid Blue 9 (C. I. 42,090), Acid Blue 45, Acid Blue 62 (C. I. 62,045), Acid Violet 7 (C. I. 18,055), Acid Black 10 B (C. I. 20,470), Kayakurenzaa Black B (C. I. 30,336), Kayanol Milling Black TLR, Brilliant Acid Blue (C. I. 42,051), Brilliant Acid Green (C. I. 42,100), etc.

As useful basic dyes, there are Basic Yellow 2 (C. I. 41,000), Basic Yellow 23, Basic Red 35, Basic Yellow 1 (C. I. 49,005), Basic Red 1 (Rhodamine 6 GLP) (C. I. 45,160), Basic Red 2 (C. I. 50,240), Basic Blue 25 (C. I. 52,025), Basic Violet 3 (C. I. 42,555), Basic Violet 10 (C. I. 45,170).

Basic Blue G. O. (C. I. Basic Blue 25), Deoruren Blue 5G (C. I. Basic Blue 3), Jenasu Black BR (C. I. 11,825), C. I. Basic Black 2, Auramine 0-100 (C. I. Basic Yellow 2), Brilliant Basic Cyanine (C. I. 42,025), Alkali Blue B (C. I. 704), etc.

As useful oil dyes, there are Oil Orange (C. I. 12,055), Oil Black 2HB (C. I. 50,415), Oil Blue G Extra (C. I. 61,525), Oil Orange SS (C. I. 12,100), Oil Red (C. I. 26,105), Oil Red AS (C. I. 26,100), Oil Red XO (C. I. 12,140), Oil Violet (C. I. 26,050), Oil Yellow AB (C. I. 11,380), Oil Yellow OB (C. I. 11,390), Nigrosine Solvent Soluble (C. I. 864), Spirit Blue CR (C. I. 689), Oil Blue N, Oil Red 4B, C. I. Disperse Voilet 4 (C. I. 61,105), etc.

They may be used, if desired or necessary, as a combination of two or more thereof.

These pigments or dyes may be used in the form of microcapsules or in the form of a dispersion in a binder layer.

In the case of pigments, they can be easily dispersed, but, in the case of dyes, it is profitable to use them in combination with a binder in which the dyes are not substantially dissolved. As examples of such a combination, in the case of using an oil soluble dye, there is a combination of such a dye and a hydrophilic binder such as gelatin, polyvinyl alcohol, polyhydroxyethyl methacrylate, a styrene-butadiene latex, etc., and as an example of combinations involving a hydrophilic dye, there is a combination of the dye and a binder such as polybutyl methacrylate, chlorinated paraffin, a vinyl chloride-vinyl acetate copolymer, paraffin, etc.

It is particularly preferred to use oil-soluble dyes among the afore-mentioned dyes.

In the case of dispersing the oil-soluble dye, it is preferred to first dissolve the dye in a solvent such as dibutyl phthalate, di-t-amylnaphthalene, diisopropyl naphthalene, tributyl diphenylmethane, triphenyl phosphite, etc.

In this case, an organic solvent such as ethyl acetate, methyl ethyl ketone, etc., and a surface active agent such as sodium dodecylbenzene sulfonate, sorbitan monolaurate, nonyloxypolyethylene oxide, etc., may be used together, if desired.

The color formers indicated above may be used singularly or as a combination of two or more.

When the color former is used in microcapsules as a solution thereof in a solvent, there is no particular restriction on the solvent for the color former and conventionally used solvents can be employed for the purpose. Examples of these solvents are aromatic synthetic oils such as alkylated naphthalene, alkylated biphenyl, hydrogenated terphenyl, and alkylated diphenylmethane (the carbon number of the alkyl group of these aromatic oils is about 1–5 and the number of alkyl groups is 1–4); petroleum fractions such as kerosene, naphtha, paraffin oil, etc.; aliphatic synthetic oils such as chlorinated paraffin, etc.; vegetable oils such as cotton seed oil, soybean oil, linseed oil, etc.; and mixtures thereof. There is no particular restriction on the concentration of the solution of the color former, and concentrations as are conventionally used in the art to achieve good coloring are used.

Thus, a microcapsule-containing coating composition is obtained. It is desirable that the microcapsules used in this invention be mononuclear, but the objects of this invention can be attained when polynuclear microcapsules are used. The size of the microcapsules containing the color former is usually about 0.1 to about 100 microns, preferably about 0.5 to 50 microns. In this invention, the microcapsules used may also have substantially the same size, if desired.

The microcapsule-containing coating solution is generally a capsule dispersion and thus may be coated on a support as it is. Alternatively, the microcapsules may be separated or not be separated from the capsule dispersion and coated on a support together with a binder such as a latex (e.g., a styrene-butadiene rubber latex etc.) and a water-soluble polymer (e.g., starch, carboxymethyl cellulose, polyvinyl alcohol, gum arabic, casein, gelatin, etc.,). Furthermore, the microcapsule-containing coating composition or the microcapsule-containing layer may have added thereto a capsule reinforcing agent such as a fine cellulose powder (as described in U.S. Pat. No. 2,711,375), a fine polymer powder (as described in U.S. Pat. No. 3,625,736), a fine starch powder (as described in British Pat. No. 1,232,347), and microcapsules free of color former (as described in British Pat. No. 1,235,991). It is preferred that the capsule reinforcing agent not be in layer form but be scattered in or on the capsule layer.

The microcapsule-containing coating composition is generally coated at a coverage of about 0.5 to about 17 g/m², particularly 2 to 6 g/m². Where pigments or dyes are used, a coating composition containing the same is also generally coated at the range given for the microcapsule-containing coating composition.

The support used in this invention has on the surface thereof a regularly embossed or rugged pattern, i.e., a regular (repeating) pattern is embossed upon the support. As examples of such a regularly embossed or rugged pattern, such are generally concavo-convex in cross section. For instance, in cross section a hollow rectangle with one side removed (the upper or top side removed), or in cross section an inverted "T". The plane figure of the pattern, that is, viewing the pattern from above, is generally composed of polygons such as triangles, quadrangles, pentagons, hexagons, heptagons, octagons, etc.; rhombs; a star-shaped pattern; a stripe pattern; parallelograms; ovals; circles; etc. A part of the lines of these patterns may be replaced by curves or a part of the curves of these patterns may be replaced by lines; for example, with U-shaped patterns the top thereof may be removed to provide a roughly frusto-conical pattern, and with a pyramidal pattern the top thereof may be rounded to provide a roughly sinusoidal-like pattern. Among the patterns illustrated above, a pattern composed of triangles, quadrangles, hexagons, or circles is profitably employed. Furthermore, the sectional plane of the embossed or rugged pattern, that is, viewing the pattern in cross section, the shape of the pattern formed on the surface of the support used in this invention may be a triangle, a quadrangle, a pentagon, a trapezoid, a semicircle, a semioval, etc. Among these shapes illustrated above, a triangle, a quadrangel, a trapezoid, and a semicircle are profitably used. Still further, a part of the lines of the sectional shapes may be replaced by curves and a part of the curves of the sectional shapes may be replaced by lines as earlier exemplified for the replacement of a part of the lines of patterns with curves or part of the curves of patterns with lines.

The plane figure or the sectional shape of the embossed or rugged pattern formed on the surface of the support used in this invention may be a regular distribution of a single kind of pattern or shape as illustrated above or may be a regular distribution of a combination of plural kinds of the above-illustrated patterns or shapes.

It is desired that the size of each cell or unit of the pattern formed on the surface of the support used in this invention be about 10 to about 250 mesh, considering the desired accuracy for pressure measurment. In particular, the size is most preferably about 30 to 80 mesh. The preferred depth of the embossed or rugged pattern is about 1 to about 200 microns, in particular, 10 to 100 microns. The area ratio of the convexed portions and the concaved portions of the regularly embossed or rugged pattern of the support surface is preferably from about 1/20 to about 20.

The pattern illustrated above can be formed on the surface of a support by an embossing method, if desired. One embossing method is a plate embossing method in which a metal plate having carved or marked thereon a pattern of a form opposite to the form of a desired pattern in a concave-convex relationship is pressed onto the surface of a support to form the desired pattern thereon. In particular, when the support employed is a thermoplastic sheet, a metal plate is often used at a definite temperature. Another embodiment of the embossing method is a roll embossing method in which a support is inserted between a metal roll having carved or marked on the surface thereof a pattern of a form opposite to the form of a desired pattern in concave-convex relationship and a roll covered by hard rubber or cotton and the support is pressed therebetween by rotating the rolls to form the desired pattern on the surface of the support. In this case also, when the support employed is a thermoplastic sheet, the metal roll is often kept at a definite temperature.

Still another embodiment of the embossing method is a melt extrusion embossing method in which, in the case of forming a sheet of thermoplastic polymer by melt extrusion, the sheet formed is pressed onto a cooling roll having carved or marked on the surface thereof a pattern of a form opposite to the form of the desired pattern in concave-convex relationship by means of a nip roll to form the desired pattern on the surface of the plastic sheet.

A dissolution removal method can also be employed in this invention for forming a pattern as illustrated above on the surface of a support (the pattern formed by such a dissolution removing method is also called an "embossed pattern" in this invention). That is, in the dissolution removing method, solid particles are dispersed in a resin or polymer and, after forming a sheet of the resin or polymer by extrusion, etc., the solid particles are dissolved out to form a concave pattern on the surface of the sheet. In this case, it is desirable that the solid particles have a size of about 10 to about 250 mesh and have a uniform shape. When, for example, polyethylene is used as the material forming the sheet or support, particles of sodium carbonate, Glauber's salt, magnesium sulfate, calcium sulfate, polystyrene, polymethyl methacrylate, etc., are used as the solid particles to be dispersed therein. By dissolving out the solid particles as illustrated above dispersed in the polymer sheet, convex portions are regularly formed on the surface of the sheet.

The embossing method is most profitably used in this invention among the methods described above.

The materials for forming the supports used in this invention are not particularly limited, and generally speaking they are web-like materials which are thin and tough, i.e., once embossed with the regular (repeating) pattern, the support material will retain that pattern during use as a recording sheet. So long these general criteria are met, there is no special limitation upon the supports selected. Exemplary supports include not only synthetic polymers, paper and natural materials, but those materials as exemplified below, for example, wood papers, metal materials, glass fibers, etc. Exemplifying the supports, there are polyethylene, polypropylene, polyethylene terephthalate, polystyrene, nylon, polycarbonate, polyvinyl chloride, polysulfone, polyimide, polytetrafluoroethylene, methyl methacrylate, polyvinyl alcohol, ionomer, cellulose triacetate, ethylenic copolymers such as an ethylene-acrylic acid copolymer, an ethylene-sodium acrylate copolymer, an ethylene-acrylic acid-sodium acrylate copolymer, an ethylene-zinc acrylate copolymer, an ethylene-methacrylic acid copolymer, an ethylene-sodium methacrylate copolymer, an ethylene-methacrylic acid-sodium methacrylate copolymer, an ethylene-vinyl sulfonic acid copolymer, an ethylene-vinyl acetate copolymer, etc.; a propylenic copolymer, a vinyl chloride copolymer, a styrene copolymer, and blends of these materials. Furthermore, paper and natural polymers such as gelatin can also be used as the materials for forming the support. Also, a synthetic paper prepared using a synthetic pulp of polyethylene, polypropylene etc., or a synthetic paper prepared from a mixture of a synthetic pulp and wood pulp can be also utilized in place of paper.

Moreover, a thin plate or foil of a metal such as aluminum, copper, iron, etc., and also a sheet of an inorganic substance such as glass fibers can be also utilized as the support in this invention. In particular, when the portion on which the pressure measurement is practiced is at a high temperature, the use of a metal sheet or foil is effective. Furthermore, laminates of the above-indicated synthetic plastic sheets, natural polymer sheets, metal foils, and inorganic substance sheets may also be used in this invention. For example, a laminate prepared by applying a synthetic resin as above exemplified on one or both surfaces of a paper and a laminate prepared by applying a synthetic resin as above exemplified on one or both surfaces of a metal foil or sheet as above exemplified can be utilized as the support in this invention.

Such a laminate may be prepared by a simple lamination, a melt extrusion coating, a melt co-extrusion coating, plating, vacuum evaporation, etc. In the case of using a laminate, various surface activation methods can be utilized to improve the bonding strength between the support surface and the coated layer. For example, physical methods such as a corona discharge, a glow discharge, a flame treatment, etc., or a chemical method such as an anchor coating method, a subbing method, etc., can be employed for this purpose.

The thickness of the support used in this invention most profitably is from about 10 microns to about 500 microns.

By the term "developer" in this specification is meant a solid acid, more specifically, an electron accepting solid acid. Various developers useful in this invention are described in the earlier cited patents in this specification. Specific examples of the developers are clays (e.g., acid clay, activated clay, attapulgite, etc.,), organic acids (e.g., an aromatic carboxylic acid such as salicylic acid, etc., and an aromatic hydroxyl compound such as p-t-butylphenol, p-t-amylphenol, o-chlorophenol, m-chlorophenol, p-chlorophenol, etc.,), metal salts of these organic acids (e.g., zinc salts of these organic acids), mixtures of there organic acids and metal compounds (e.g., zinc oxide), and acid polymers (e.g., a phenol-formaldehyde resin, a phenol-acetylene resin, etc.,).

Other developers useful in this invention are described in U.S. Pat. Nos. 3,501,331; 3,669,711; 3,427,180; 3,455,721; 3,516,845; 3,634,121; 3,672,935; and 3,732,120 and Japanese Patent Publications 48,545/'70; 49,339/'70; 93,245/'70; 92,246/'70; 93,247/'70; 94,874/'70; 109,872/'70; 112,038/'70; 112,039/'70; 112,040/'70; 112,753/'70; 112,754/'70; 118,978/'70; 118,979/'70; and 86,950/'71.

The developer may be coated on the support together with a binder. The same binders may, of course, be used for the color forming material as earlier described, i.e., for a microcapsule dispersion, a pigment, a dye or the like. While not to be construed as limitative, considering the ease of commercial availability and results obtained, preferred binders typically have a molecular weight on the order of from about 15,000 to about 800,000. As the binder used for this purpose, there can be illustrated a styrene-butadiene rubber latex; a styrene-butadiene-acrylonitrile latex; water-soluble natural polymers such as proteins (e.g., gelatin, gum arabic, albumin, casein, etc.,), cellulose derivatives (e.g., carboxymethyl cellulose, hydroxyethyl cellulose, etc.,), and saccharose (e.g., agar-agar, sodium alginate, starch, carboxymethyl starch, etc.,); water-soluble synthetic polymers such as polyvinyl alcohol, polyvinyl pyrrolidone, polyacrylic acid, polyacrylamide, etc.; and organic solvent-soluble polymers such as nitrocellulose, ethyl cellulose, polyesters, polyvinyl acetate, polyvinylidene chloride, a vinyl chloride-vinylidene chloride copolymer, etc., with exemplary organic solvents including ketones, ethers, alcohols, aromatic hydrocarbons, halogenated hydrocarbons or the like, all of which are well known in the art as organic solvents for polymers. The developer-containing layer or the developer layer may further contain conventional additives.

The characteristics required for the recording sheets for pressure measurement in this invention are firstly that there be a correlation (for example, a direct proportion or an inverse proportion) between the applied pressure and the change in optical density of the colored image formed by the application of the pressure onto the recording sheet which is brought into contact to a portion to be measured, and, secondly that the measurement error be low and the accuracy of the pressure measurement be high in the correlation described above.

As a result of continuing research, the inventors found that a recording sheet for pressure measurement which permits one to simply and easily measure surface pressure or line pressure with high accuracy is obtained by coating at least one of microcapsules containing a color former or a developer on a support having a regularly embossed or rugged pattern on the surface thereof.

In practicing pressure measurement using the recording sheet of this invention, the recording sheet is placed between the areas or portions to be measured where the pressure is, the pressure is applied to the area or portions to be measured, and the recording sheet is thereby colored according to the extent of the pressure applied. The change in optical density of the colored image is measured, and, from the value thus measured, the value of the applied pressure is determined. The value of the applied pressure may be determined using an ordinary detector such as a densitometer or may be determined using a table or a calibration curve showing the relationship between the density of the color recorded and the applied pressure, the table or calibration curve being prepared beforehand.

As compared with conventional methods of measuring surface pressure, line pressure, etc., using a strain gauge, a load meter, a pressure-sensitive paint, etc., the pressure measurement method using the recording sheet of this invention has the merits that operation is very simple, large equipment such as an amplifier, a detector, a recorder, etc., are not required, and the value of the applied pressure is determined without the need of highly skilled techniques or complicated procedures to calculate the strength of materials.

Moreover, as compared with conventional pressure measurement methods in which pressure measurement is mostly based on a point indication, the pressure measurement method using the recording sheet of this invention has the merits that a wide pressure distribution of surface pressure, line pressure, etc., can be measured, as well as a record of the pressure distribution can be kept for a long time in a simple manner.

Furthermore, the recording sheet for pressure measurement of this invention does not have the commercial defect that the hands and clothes of users are stained and coloring occurs excessively as with conventional pressure-sensitive laminates.

Still further, as compared with conventional recording sheets for pressure measurement prepared using a support having a smooth or irregularly embossed surface, the recording sheet for pressure measurement of this invention has the excellent merit that there is no irregular local unevenness in the optical density of the recorded colored image formed by the application of pressure, as well as the value of the applied pressure can be determined more accurately.

Moreover, in the recording sheet for pressure measurement of this invention, by controlling the depth of the embossed or rugged pattern of the support surface, the range of pressure measurable can be enlarged.

Also, the recording sheet for pressure measurement of this invention has the merits that when a synthetic plastic sheet, a metal foil, or an inorganic substance sheet having excellent oil resistance, water resistance, and heat resistance is used as the support for the recording sheet, the pressure measurement can be performed with a high accuracy without being influenced by oil, water, and heat, even if the portion to be measured is stained by oil or water or is at a high temperature.

The following examples illustrate the practical merits of the recording sheets for pressure measurement of this invention in detail, but the invention is not, as a matter of course, limited to the embodiments shown in these examples. In addition, all parts in these examples, unless otherwise indicated, are by weight.

Furthermore, the microcapsule-containing coating compositions and the developer-containing coating compositions used in these examples for confirming the merits of the recording sheets of this invention were prepared in the following manner. In the following detailed description of various preferred embodiments of the invention, all parts, percentages and the like are by weight, unless otherwise indicated.

PREPARATION OF MICROCAPSULE-CONTAINING COATING COMPOSITION A

In 400 parts of water maintained at 40° C. were dissolved 10 parts of acid-treated pig skin gelatin and 10 parts of gum arabic and after adding thereto 0.2 part of Turkey red oil as an emulsifier, 40 parts of a color former oil was dispersed by emulsification in the mixture. In this case, the particle size of the microcapsules formed was an average of 2 to 3 microns. The color former oil used was prepared by dissolving 1 part of Crystal Violet Lactone in a mixture of 4 parts of diisopropyl naphthalene and 1 part of kerosene.

Thereafter, water at 40° C. was added to the dispersion to make a total volume of 900 parts, followed by stirring. At this time, precautions were taken so that the temperature of the dispersion did not lower to below 40° C. The pH of the dispersion was then adjusted to 4.0 to 4.2 by adding 10% acetic acid to cause coacervation at 40° C. The system was further stirred at 40° C for 20 minutes and then cooled by ice-water to gel the coacervate formed around the oil droplets. When the temperature of the system reached 20° C., 7 parts of 37% formaldehyde was added to the system. When the temperature of the system became 10° C., 40 parts of a 7% aqueous solution of the sodium salt of carboxymethylcellulose was added thereto and an 15% aqueous solution of sodium hydroxide was added dropwise to the system to adjust the pH thereof to 9. At this time, the addition of sodium hydroxide was carefully conducted so as to avoid the formation of heterogeneous by-products. The mixture was then heated to 50° C. with stirring over a 20 minute period, and, thereafter, the temperature was lowered to 30° C. to provide a microcapsule-containing coating composition.

PREPARATION OF MICROCAPSULE-CONTAINING COATING COMPOSITION B

In 30 parts of alkylated diphenylmethane were dissolved 3 parts of Rhodamine B Lactam and 3 parts of 3-diethylamino-7-methylfluoran, and, thereafter, 4 parts of the trimethylolpropane addition product of tolylene diisocyanate, 4 parts of the trimethylolpropane addition product of hexamethylene diisocyanate, and 2 parts of the propylene oxide addition product of ethylenediamine were dissolved in the solution. The solution thus prepared was dispersed by emulsification in a solution of 2 parts of carboxymethyl cellulose and 2 parts of polyvinyl alcohol in 40 parts of water. The particle size of the microcapsules formed was set to 1 to 2 microns on the average, and the temperature at emulsification was set at 20° C. After emulsification, 150 parts of water was added to the dispersion and the temperature thereof raised up to 70° C. while stirring. After adjusting the temperature of the system to 30° C., 10 parts of cellulose floc and 5 parts of oxidized starch were added thereto to provide a microcapsule-containing coating composition.

PREPARATION OF DEVELOPER-CONTAINING COATING COMPOSITION A

This developer-containing coating composition was prepared by kneading a mixture of 100 parts of sulfuric acid treated acid clay, 20 parts of nitrocellulose, and 350 parts of ethyl acetate for 24 hours in a ball mill.

PREPARATION OF DEVELOPER-CONTAINING COATING COMPOSITION B

This developer-containing coating composition was prepared by kneading a mixture of 50 parts of p-phenylphenol-formaldehyde resin, 100 parts of butyl acetate, and 100 parts of toluene for 24 hours in a ball mill.

PREPARATION OF DEVELOPER-CONTAINING COATING COMPOSITION C

This developer-containing coating composition was prepared by kneading a mixture of 60 parts of zinc 3,5-di-tertbutylsalicylate, 20 parts of kaolin, 10 parts of ethyl cellulose, 100 parts of ethanol, and 100 parts of isopropyl acetate for 24 hours in a ball mill.

PREPARATION OF SUPPORTS

Low density polyethylene (melt index of 20; Sumikathene L-211, trade name, made by Sumitomo Chemical Industries Co., Ltd.) was coated in equal amounts on both surfaces of a paper (95 g/m² basis weight; 100 microns thick) so that the total thickness became 0.04 mm. by melt extrusion using a screw-type melt extruder having an outlet diameter of 60 mm. equipped with a T-type die having a width of 500 mm. The drawing rate of the polyethylene at coating was 30 m/min. By employing various cooling rolls for casting, each having a different pattern, the following supports each having different surface pattern were prepared.

Support A: having a smooth surface.

Support B: having an irregular embossed surface pattern (mat finishing pattern).

Support C: having a regularly embossed surface pattern (the plane figure of the embossed surface pattern was circular, the sectional shape of the pattern was semicircular, the depth of the embossed pattern was 20 microns, the size of each unit of the embossed pattern was 60 mesh, and the area ratio of the convexed portions was 1/5).

Casting of polyethylene on the surface of the support opposite the pattern-bearing side was performed by means of a smooth cooling roll. After subjecting the pattern-bearing surface of the support to a corona discharge using a corona discharge apparatus (made by the Sofutaru Co.) a subbing composition consisting of gelatin, alcohol, and water was coated on the surface at dry thickness of 0.001 mm. followed by drying.

EXAMPLE 1

The Microcapsule-containing coating composition B prepared in the above-described manner was coated on each of supports A, B, and C described above at the pattern-bearing surface by air knife coating at a coverage of 5 g/m² (solid content; the same is used hereinafter) followed by drying.

Then, developer-containing coating composition A prepared above was further coated on the microcapsule-containing layer at a coverage of 6 g/m² to provide a recording sheet. By following the same procedure as above, 3 kinds of recording sheets were prepared. Each of the recording sheets thus prepared was put in a press machine which could change the pressing pressure in the range of 0 to 100 kg/cm², and samples of each of the sheets were pressed at a pressure of 20 kg/cm.², 60 kg/cm.² and 100 kg/cm.². The color density of the recording sheet thus formed was measured by means of a densitomer (P-type Densitomer made by Fuji Photo Film Co., Ltd.).

The results obtained are shown in Table 1.

Table 1

| Pressure | 20 kg/cm² | 60 kg/cm² | 100 kg/cm² |
|---|---|---|---|
| Recording sheet by support A | 0.58 (0.14) | 0.95 (0.04) | 0.99 (0.02) |
| Recording sheet by support B | 0.32 (0.20) | 0.85 (0.06) | 0.98 (0.02) |
| Recording sheet by support C | 0.24 (0.04) | 0.62 (0.02) | 0.99 (0.01) |

In the above table, the numerical values without parentheses show the measured values of the densities in the recording sheets prepared using supports A, B, and C, respectively, when a pressure of 20 kg/cm², 60 kg/cm², or 100 kg/cm² was applied, and the numerical values in the parentheses show the dispersion as defined below of each measured value of density. The measured value of density shown in the table is the mean value of the values at five arbitrary points in colored portions and the value of the dispersion is the difference between the highest value and the lowest value of each measured density value divided by the afore-mentioned mean value.

As is shown in the above table, in the recording sheet (of this invention) prepared using support C, the coloring density was in proportion to the applied pressure in the above-mentioned pressure range and the dispersion of the measured value of density at each applied pressure was lowest.

EXAMPLE 2

Microcapsule-containing coating composition A prepared in the above-described manner was coated on each of supports A, B, and C, respectively, at the pattern-bearing side at a coverage of 5 g/m² by blade coating followed by drying to provide color former sheets. In this way, three kinds of color former sheets were prepared. Separately from this, developer-containing coating composition B prepared above was coated on the surface of support A at a coverage of 6 g/m² to provide a developer sheet. Three such developer sheets were prepared and were used in combination with the above-mentioned three kings of color former sheets. Thus, three kinds of recording sheets (combinations of the color former sheets and developer sheets) were prepared.

Each of the recording sheets thus prepared was set in a press machine which could change the applied pressure in the range of 0 to 100 kg/cm² and a pressure of 20 kg/cm², 60 kg/cm² or 100 Kg/cm² was applied to samples of the recording sheets. The color density of each recording sheet formed thereby was measured by means of a densitometer (P-type Densitometer made by Fuji Photo Film Co., Ltd.). The results are shown in Table 2.

Table 2

| Pressure | 20 kg/cm² | 60 kg/cm² | 100 kg/cm² |
|---|---|---|---|
| Recording sheet by support A | 0.60 (0.15) | 0.93 (0.04) | 0.99 (0.02) |
| Recording sheet by support B | 0.35 (0.20) | 0.87 (0.08) | 0.99 (0.03) |
| Recording sheet by support C | 0.25 (0.04) | 0.61 (0.02) | 0.98 (0.01) |

In the above table, the values have the same meaning as given in Table 1.

As is shown in Table 2, in the recording sheet having in combination the color former sheet prepared using support C (i.e., the recording sheet of this invention), the coloring density was almost in proportion to the applied pressure and the dispersion of the measured value of density at each applied pressure was the lowest.

EXAMPLE 3

Developer-containing coating composition C prepared in the above-mentioned manner was coated on the surfaces of supports A, B, and C at the pattern-bearing side at a coverage of 6 g/m² by bar coating followed by drying to provide developer sheets. Separately from this, microcapsule-containing coating composition B prepared by the afore-mentioned manner was coated on the surface of support A described above at a coverage of 5 g/m² by bar coating followed by drying to provide a color former sheet. Thus, three kinds of recording sheets (each being a combination of the developer sheet and the color former sheet) were formed.

Each of the recording sheets was put in a press machine which could change the applied pressure in the range of 0 to 100 kg/cm² and a pressure of 20 kg/cm², 60 kg/cm², or 100 kg/cm² was applied to samples of the recording sheets. The color density of each recording sheet formed by the application of pressure was measured by means of a densitometer (P-type Densitometer made by Fuji Photo Film Co., Ltd.). The results are shown in Table 3.

TABLE 3

| Pressure | 20 kg/cm² | 60 kg/cm² | 100 kg/cm² |
|---|---|---|---|
| Recording sheet by support A | 0.55 (0.16) | 0.90 (0.07) | 0.98 (0.03) |
| Recording sheet by support B | 0.30 (0.23) | 0.80 (0.06) | 0.97 (0.03) |
| Recording sheet by support C | 0.24 (0.04) | 0.61 (0.02) | 0.99 (0.01) |

In the above table, the values have the same meaning as given in Table 1.

As is shown in Table 3, in the recording sheet having in combination the developer sheet prepared using support C, the color density was almost in proportion to the applied pressure and the dispersion of the measured density value at each applied pressure was the lowest.

While the invention has been described in detail and with reference to specific embodiments thereof, it will be apparent to one skilled in the art that various changes and modifications can be made therein without departing from the spirit and scope thereof.

What is claimed is:

1. A recording sheet comprising a support having coated thereon a continuous layer of microcapsules containing color former, said microcapsules being 0.1 to 100 microns in size and said support having a regularly embossed pattern thereon, said pattern being about 10 to 250 mesh and having a depth of 1 to about 200 microns.

2. The recording sheet as set forth in claim 1 wherein said embossed pattern is formed by embossing the surface of the support with an embossing plate or roll having a regular embossed pattern on the surface thereof.

3. The recording sheet as set forth in claim 1 wherein said support is a laminated sheet prepared by coating a polymer on the surface of a sheet by melt extrusion and the embossed pattern is formed by pressing the polymer surface with a cooling roll having a regularly embossed pattern on the surface.

4. A two-ply recording sheet comprising two supports, one of said supports having a regularly embossed pattern and being coated with a continuous layer of microcapsules containing color former, the other of said supports bearing developer, said microcapsules being 1 to 200 microns in size and said patterns being 10 to about 250 mesh in size and having a depth of 1 to about 200 microns.

5. A monoply recording sheet comprising a support having a regularly embossed pattern and being coated with a continuous layer of developer and microcapsules containing color former, said microcapsules being 1 to 200 microns in size and said pattern being 10 to about 250 mesh in size and having a depth of 1 to about 200 microns.

6. A two-ply recording sheet comprising a color former sheet comprising a support having coated thereon a continuous layer of color former and a developer sheet comprising a support having coated thereon a continuous layer of developer, at least one of the supports for said color former sheet and said developer sheet having a regularly embossed pattern on the surface bearing the color former or the developer.

* * * * *